US010782996B2

(12) United States Patent
Riewrangboonya et al.

(10) Patent No.: US 10,782,996 B2
(45) Date of Patent: *Sep. 22, 2020

(54) AUTOMATIC NETWORK CONFIGURATION OF A PRE-CONFIGURED HYPER-CONVERGED COMPUTING DEVICE

(71) Applicant: VMware, Inc., Palo Alto, CA (US)

(72) Inventors: Wit Riewrangboonya, Mountain View, CA (US); Michael R. MacFaden, San Jose, CA (US); Dave Shanley, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,054

(22) Filed: Nov. 28, 2018

(65) Prior Publication Data

US 2019/0171475 A1 Jun. 6, 2019

Related U.S. Application Data

(63) Continuation of application No. 14/530,197, filed on Oct. 31, 2014, now Pat. No. 10,169,064.

(60) Provisional application No. 61/985,648, filed on Apr. 29, 2014, provisional application No. 61/985,660, filed on Apr. 29, 2014, provisional application No. 61/985,674, filed on Apr. 29, 2014.

(51) Int. Cl.
*G06F 15/177* (2006.01)
*G06F 9/455* (2018.01)
*H04L 12/24* (2006.01)
*H04L 12/26* (2006.01)

(52) U.S. Cl.
CPC ...... *G06F 9/45558* (2013.01); *H04L 41/0813* (2013.01); *H04L 41/0816* (2013.01); *H04L 41/12* (2013.01); *G06F 2009/45562* (2013.01); *H04L 43/045* (2013.01); *H04L 43/065* (2013.01)

(58) Field of Classification Search
CPC ....... G06F 9/45558; G06F 2009/45562; H04L 41/12; H04L 41/0816; H04L 43/045
USPC ........................................ 709/214, 217, 220
See application file for complete search history.

(56) References Cited

U.S. PATENT DOCUMENTS

| 8,089,953 | B2 | 1/2012 | Angelot et al. |
| 8,929,377 | B2 | 1/2015 | Yang et al. |
| 9,319,295 | B2 | 4/2016 | Sturgeon et al. |
| 2005/0060426 | A1 | 3/2005 | Samuels et al. |
| 2005/0063302 | A1 | 3/2005 | Samuels et al. |
| 2005/0063303 | A1 | 3/2005 | Samuels et al. |

(Continued)

OTHER PUBLICATIONS

"Third-Party Submission Under 37 CFR 1.290, Oct. 30, 2015, 16 pgs.".

*Primary Examiner* — Umar Cheema
*Assistant Examiner* — Marshall M McLeod

(57) ABSTRACT

In a computer-implemented method for automatic network configuration of a pre-configured hyper-converged computing device network configuration information is requested from another pre-configured hyper-converged computing device already configured on a network. The network configuration information is received from the another pre-configured hyper-converged computing device. The network configuration is automatically performed by the pre-configured hyper-converged computing device such that the pre-configured hyper-converged computing device is automatically configured to the network.

20 Claims, 14 Drawing Sheets

(56) References Cited

U.S. PATENT DOCUMENTS

| | | |
|---|---|---|
| 2005/0063307 A1 | 3/2005 | Samuels et al. |
| 2005/0074007 A1 | 4/2005 | Samuels et al. |
| 2008/0021993 A1 | 1/2008 | Compton et al. |
| 2009/0201830 A1 | 8/2009 | Angelot et al. |
| 2009/0307703 A1 | 12/2009 | Archer et al. |
| 2010/0046372 A1 | 2/2010 | Samuels et al. |
| 2010/0293598 A1 | 11/2010 | Collart et al. |
| 2012/0129441 A1 | 5/2012 | Peng et al. |
| 2012/0201186 A1 | 8/2012 | Awano |
| 2012/0293390 A1 | 11/2012 | Shoemaker et al. |
| 2013/0132465 A1 | 5/2013 | Brown |
| 2013/0173788 A1 | 7/2013 | Song |
| 2013/0179879 A1 | 7/2013 | Zhang et al. |
| 2014/0028435 A1 | 1/2014 | Brockway et al. |
| 2014/0028816 A1 | 1/2014 | Brockway et al. |
| 2014/0028817 A1 | 1/2014 | Brockway et al. |
| 2014/0028818 A1 | 1/2014 | Brockway et al. |
| 2014/0068032 A1* | 3/2014 | Kannan .................. H04L 61/20 709/221 |
| 2014/0101467 A1 | 4/2014 | Jubran et al. |
| 2014/0109094 A1 | 4/2014 | Datla et al. |
| 2014/0188432 A1 | 7/2014 | Aljadeff |
| 2014/0188676 A1 | 7/2014 | Marmolejo-Meillon et al. |
| 2014/0189077 A1 | 7/2014 | Bauer |
| 2014/0208214 A1 | 7/2014 | Stern |
| 2014/0310754 A1 | 10/2014 | Collart et al. |
| 2015/0069119 A1 | 3/2015 | Hastman |
| 2015/0163398 A1 | 6/2015 | Brockway, III et al. |
| 2015/0163462 A1 | 6/2015 | Brockway, III et al. |
| 2015/0180714 A1* | 6/2015 | Chunn .................. H04L 41/082 709/221 |
| 2015/0186162 A1 | 7/2015 | Van Der Walt et al. |
| 2015/0188919 A1 | 7/2015 | Belton et al. |
| 2015/0312104 A1 | 10/2015 | Riewrangboonya et al. |

* cited by examiner

700

```
┌─────────────────────────────────────────────────────────────┐
│ UPON INITIAL CONNECTION TO A NETWORK, AUTOMATICALLY         │
│ BROADCAST AN AUTO-DISCOVERY REQUEST OVER THE NETWORK,       │
│ BY A FIRST PRE-CONFIGURED HYPER-CONVERGED COMPUTING         │
│ DEVICE FOR SUPPORTING A VIRTUALIZATION INFRASTRUCTURE,      │
│ TO OTHER PRE-CONFIGURED HYPER-CONVERGED COMPUTING           │
│ DEVICES ON THE NETWORK                                      │
│ 710                                                         │
└─────────────────────────────────────────────────────────────┘
                              │
                              ▼
┌─────────────────────────────────────────────────────────────┐
│ RECEIVE A RESPONSE TO THE AUTO-DISCOVERY REQUEST FROM THE   │
│ OTHER PRE-CONFIGURED HYPER-CONVERGED COMPUTING DEVICES FOR  │
│ AUTO-DISCOVERY OF THE OTHER PRE-CONFIGURED HYPER-CONVERGED  │
│ COMPUTING DEVICES ON THE NETWORK                            │
│ 720                                                         │
│                                                             │
│   ┌───────────────────────────────────────────────────┐    │
│   │ RECEIVE A RESPONSE FROM A CLUSTER OF THE OTHER    │    │
│   │ PRE-CONFIGURED HYPER-CONVERGED COMPUTING DEVICES  │    │
│   │ 722                                               │    │
│   └───────────────────────────────────────────────────┘    │
│                                                             │
│   ┌───────────────────────────────────────────────────┐    │
│   │ RECEIVE A RESPONSE FROM A STAND-ALONE DEVICE OF   │    │
│   │ THE OTHER PRE-CONFIGURED HYPER-CONVERGED          │    │
│   │ COMPUTING DEVICES                                 │    │
│   │ 724                                               │    │
│   └───────────────────────────────────────────────────┘    │
└─────────────────────────────────────────────────────────────┘

┌─────────────────────────────────────────────────────────────┐
│ ENABLE THE FIRST PRE-CONFIGURED HYPER-CONVERGED COMPUTING   │
│ DEVICE TO JOIN A CLUSTER OF THE OTHER PRE-CONFIGURED        │
│ HYPER-CONVERGED COMPUTING DEVICES                           │
│ 730                                                         │
└─────────────────────────────────────────────────────────────┘

┌─────────────────────────────────────────────────────────────┐
│ ENABLE THE FIRST PRE-CONFIGURED HYPER-CONVERGED COMPUTING   │
│ DEVICE TO BE A STAND-ALONE DEVICE IN THE NETWORK            │
│ 740                                                         │
└─────────────────────────────────────────────────────────────┘
```

UPON INITIAL OPERATION OF A FIRST PRE-CONFIGURED HYPER-CONVERGED COMPUTING DEVICE FOR SUPPORTING A VIRTUALIZATION INFRASTRUCTURE, AUTOMATICALLY BROADCAST AN AUTO-DISCOVERY REQUEST OVER THE NETWORK, BY THE FIRST PRE-CONFIGURED HYPER-CONVERGED COMPUTING DEVICE, TO OTHER PRE-CONFIGURED HYPER-CONVERGED COMPUTING DEVICES ON THE NETWORK
810

RECEIVE A RESPONSE TO THE AUTO-DISCOVERY REQUEST, AT THE FIRST PRE-CONFIGURED HYPER-CONVERGED COMPUTING DEVICE, FROM THE OTHER PRE-CONFIGURED HYPER-CONVERGED COMPUTING DEVICES FOR AUTO-DISCOVERY OF THE OTHER PRE-CONFIGURED HYPER-CONVERGED COMPUTING DEVICES ON THE NETWORK
820

ENABLE THE FIRST PRE-CONFIGURED HYPER-CONVERGED COMPUTING DEVICE TO JOIN A CLUSTER OF THE OTHER PRE-CONFIGURED HYPER-CONVERGED COMPUTING DEVICES
830

ENABLE THE FIRST PRE-CONFIGURED HYPER-CONVERGED COMPUTING DEVICE TO BE A STAND-ALONE DEVICE IN THE NETWORK
840

```
┌─────────────────────────────────────────────────────────────────┐
│ ASSIGN A UNIQUE IDENTIFIER TO EACH OF PLURALITY OF INDEPENDENT SERVER │
│   NODES IN A PRE-CONFIGURED HYPER-CONVERGED COMPUTING DEVICE    │
│                              1010                                │
└─────────────────────────────────────────────────────────────────┘
                                │
                                ▼
┌─────────────────────────────────────────────────────────────────┐
│      CORRELATE THE UNIQUE IDENTIFIER OF EACH OF THE PLURALITY OF │
│  INDEPENDENT SERVER NODES WITH A RESPECTIVE LOCATION OF EACH OF THE │
│           PLURALITY OF INDEPENDENT SERVER NODES                  │
│                              1020                                │
└─────────────────────────────────────────────────────────────────┘

┌─────────────────────────────────────────────────────────────────┐
│ DETERMINE A LOCATION OF EACH OF THE PLURALITY OF INDEPENDENT SERVER │
│  NODES WITHIN THE PRE-CONFIGURED HYPER-CONVERGED COMPUTING DEVICE │
│    BASED ON THE UNIQUE IDENTIFIER OF EACH OF THE PLURALITY OF   │
│                    INDEPENDENT SERVER NODES                      │
│                              1030                                │
└─────────────────────────────────────────────────────────────────┘
```

ACCESS A UNIQUE IDENTIFIER ASSOCIATED WITH ONE OF A PLURALITY OF INDEPENDENT SERVER NODES IN A PRE-CONFIGURED HYPER-CONVERGED COMPUTING DEVICE, WHEREIN THE UNIQUE IDENTIFIER CORRELATES TO A LOCATION OF THE ONE OF A PLURALITY OF INDEPENDENT SERVER NODES
1110

DETERMINE A LOCATION OF ONE OF A PLURALITY OF AN INDEPENDENT SERVER NODES IN THE PRE-CONFIGURED HYPER-CONVERGED COMPUTING DEVICE BASED ON THE UNIQUE IDENTIFIER
1120

FIG. 11

AUTOMATIC NETWORK CONFIGURATION OF A PRE-CONFIGURED HYPER-CONVERGED COMPUTING DEVICE

CROSS-REFERENCE TO RELATED APPLICATIONS

This application is a continuation of, and claims priority to and the benefit of, co-pending U.S. patent application Ser. No. 14/530,197, filed on Oct. 31, 2014, entitled "AUTOMATIC NETWORK CONFIGURATION OF A PRE-CONFIGURED HYPER-CONVERGED COMPUTING DEVICE," by Wit Riewrangboonya et al., and assigned to the assignee of the present application, which is hereby incorporated by reference in its entirety.

The application with Ser. No. 14/530,197 claims priority to U.S. Patent Application 61/985,648, filed on Apr. 29, 2014, entitled "AUTO-DISCOVERY OF PRE-CONFIGURED HYPER-CONVERGED COMPUTING DEVICES ON A NETWORK," by Wit Riewrangboonya, and assigned to the assignee of the present application, hereby incorporated by reference in its entirety.

The application with Ser. No. 14/530,197 claims priority to U.S. Patent Application 61/985,660, filed on Apr. 29, 2014, entitled "CORRELATING A UNIQUE IDENTIFIER OF AN INDEPENDENT SERVER NODE WITH A LOCATION IN A PRE-CONFIGURED HYPER-CONVERGED COMPUTING DEVICE," by Wit Riewrangboonya, and assigned to the assignee of the present application, hereby incorporated by reference in its entirety.

The application with Ser. No. 14/530,197 claims priority to U.S. Patent Application 61/985,674, filed on Apr. 29, 2014, entitled "AUTOMATIC NETWORK CONFIGURATION OF A PRE-CONFIGURED HYPER-CONVERGED COMPUTING DEVICE," Wit Riewrangboonya, and assigned to the assignee of the present application, hereby incorporated by reference in its entirety.

The application with Ser. No. 14/530,197 is related to U.S. patent application Ser. No. 14/529,895, filed on Oct. 31, 2014, now U.S. Pat. No. 9,626,211, entitled "AUTO-DISCOVERY OF PRE-CONFIGURED HYPER-CONVERGED COMPUTING DEVICES ON A NETWORK," by Riewrangboonya et al., and assigned to the assignee of the present application.

The application with Ser. No. 14/530,197 is related to U.S. patent application Ser. No. 14/530,087, filed on Oct. 31, 2014, now U.S. Pat. No. 9,996,375, entitled "CORRELATING A UNIQUE IDENTIFIER OF AN INDEPENDENT SERVER NODE WITH A LOCATION IN A PRE-CONFIGURED HYPER-CONVERGED COMPUTING DEVICE," by Riewrangboonya et al., and assigned to the assignee of the present application.

BACKGROUND

In conventional virtual computing environments, creating and managing hosts (e.g., ESX hosts) and virtual machines may be complex and cumbersome. Oftentimes, a user, such as an IT administrator, requires a high level and complex skill set to effectively configure a new host to join the virtual computing environment.

Moreover, if an error or failure occurs to a device in virtual computing environment, such as a datacenter, it is difficult to locate the device amongst many other devices.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 7 depicts a flow diagram for a method for auto-discovery of pre-configured hyper-converged computing devices on a network, according to various embodiments.

FIG. 8 depicts a flow diagram for a method for auto-discovery of pre-configured hyper-converged computing devices on a network, according to various embodiments.

FIG. 10 depicts a flow diagram for a method for correlating a unique identifier of an independent server node with a location in an appliance, according to various embodiments.

FIG. 11 depicts a flow diagram for a method for determining a location of an independent server node in an appliance, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiments of a Virtual Computing Environment

Figure 1:
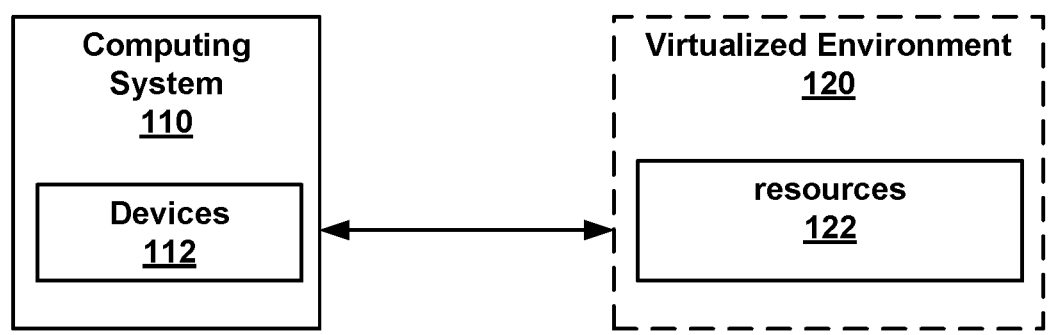
FIG. 1 depicts a block diagram of a virtual computing environment, according to various embodiments.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
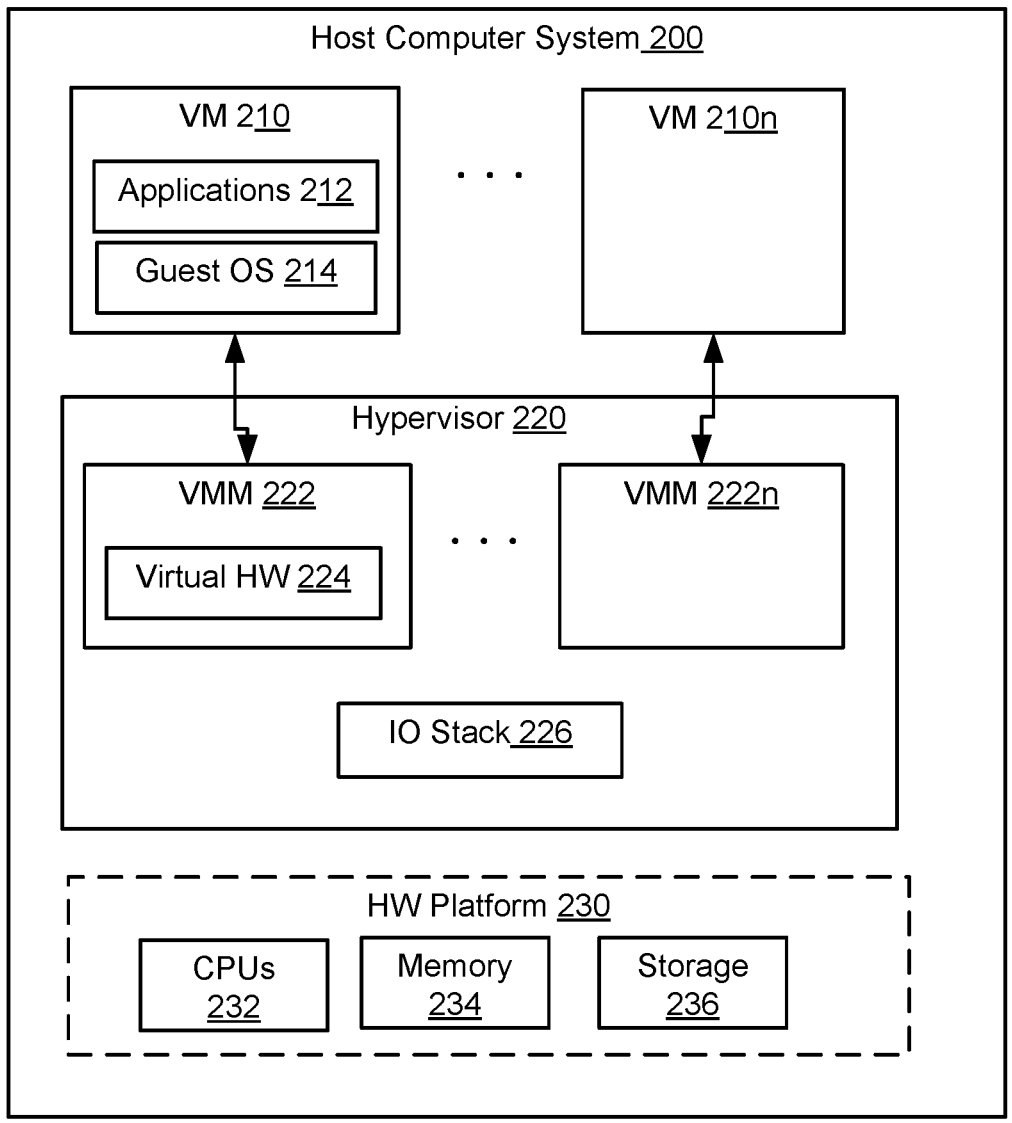
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222*n* may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
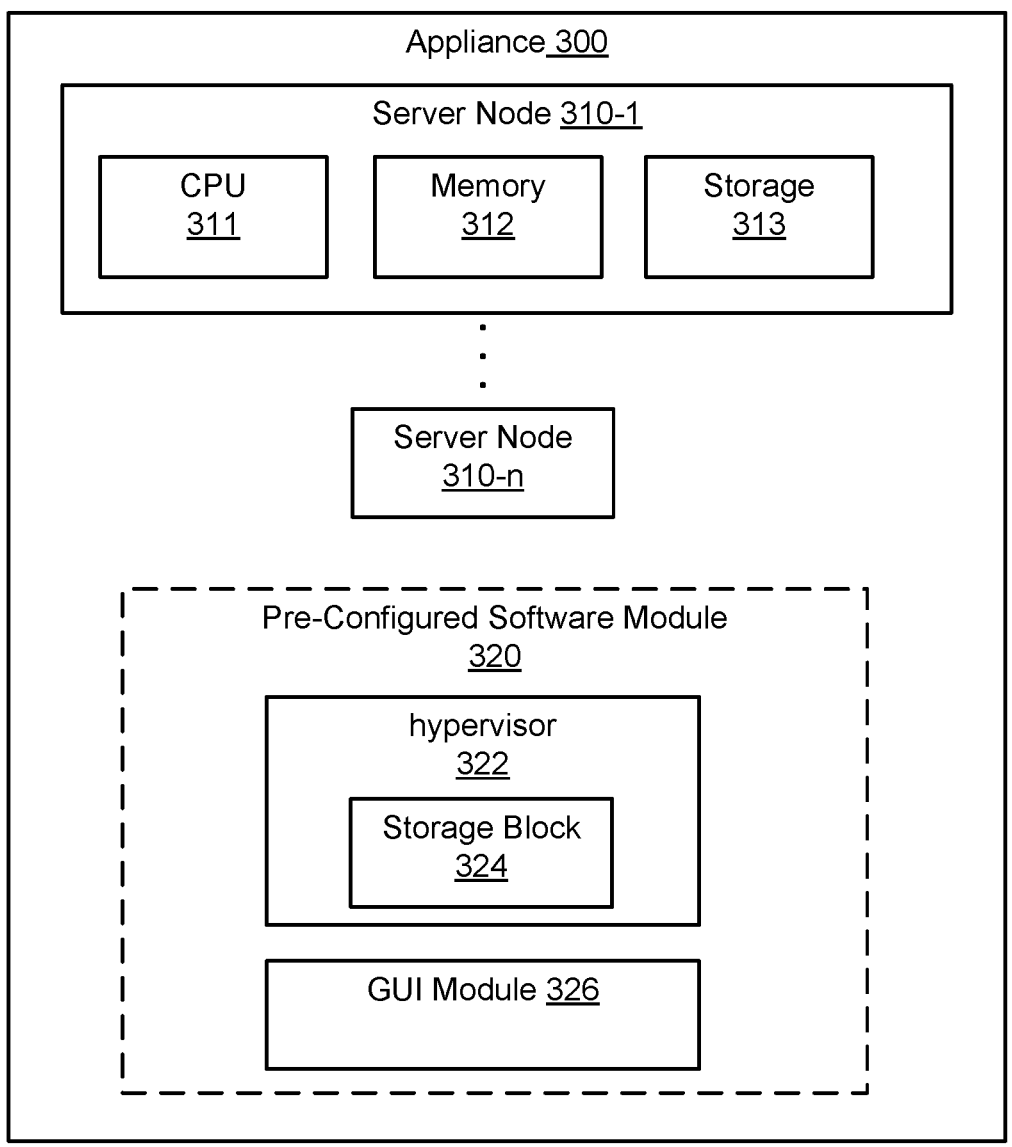
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-*n*. Server node 310-1 includes a central processing unit (CPU) 311, memory 312, and storage 313. It should be appreciated that other server nodes (i.e., server node 310-*n*) each include a CPU, memory, and storage similar to server node 310-*n*.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-*n*).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-*n*).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™ VCenter™) that utilizes various components such as a VMware ESX/ESXi hypervisor.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
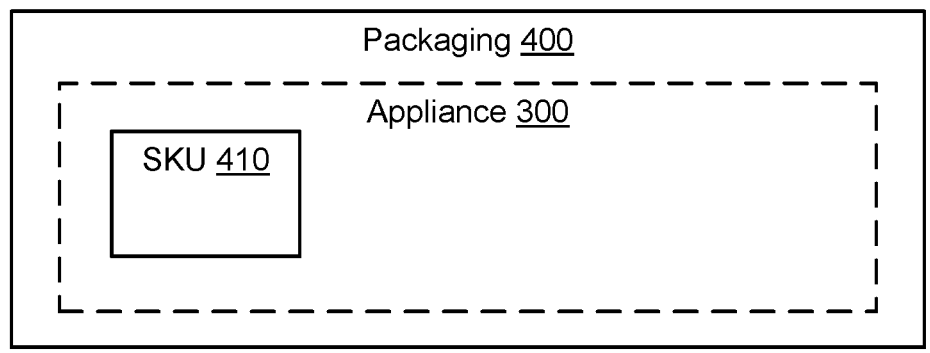
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
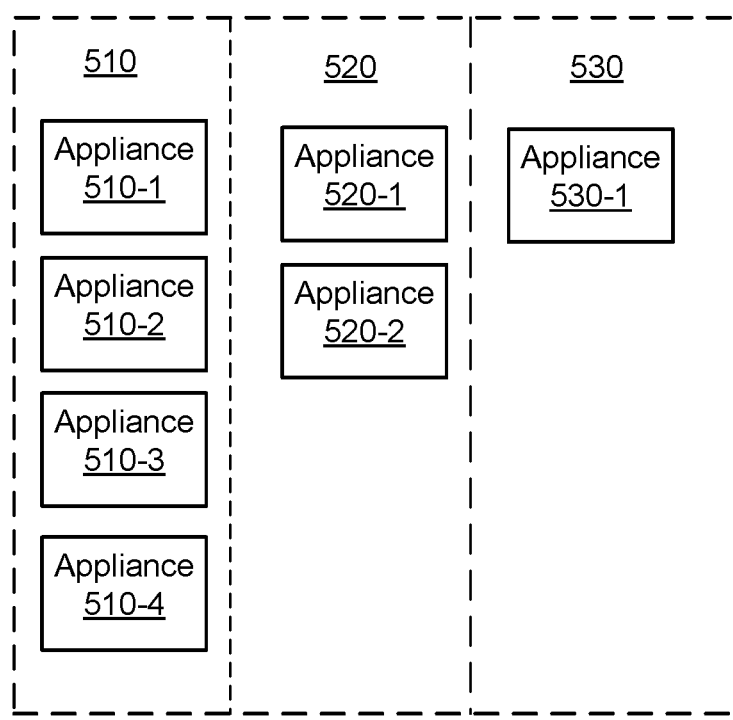
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Embodiments of Auto-Discovery of Appliances in a Network

Figure 6:
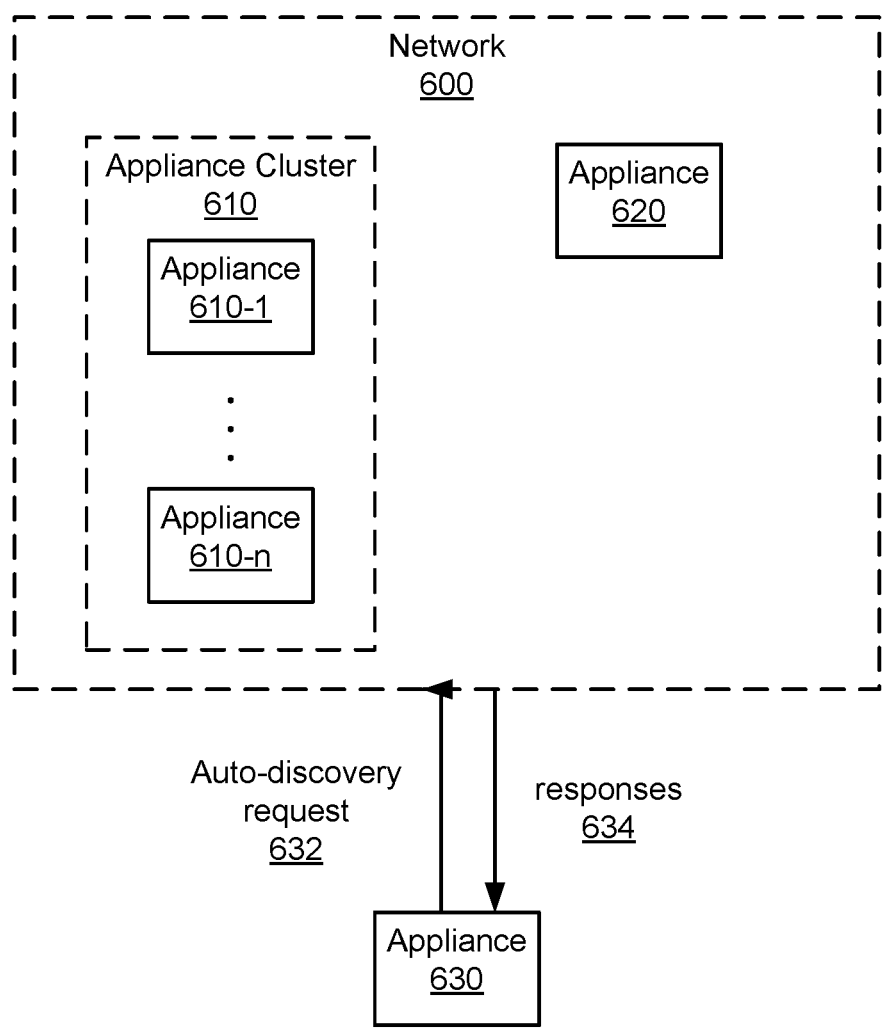
FIG. 6 depicts a block diagram of a virtualization infrastructure, according to various embodiments.

FIG. 6 depicts an embodiment of network 600 (or virtualization infrastructure).

Network 600 may include one or more appliances. For example, network 600 may include various appliances that are grouped together in a cluster and/or stand-alone.

Network 600, in one embodiment, includes appliance cluster 610 that includes appliances 610-1 through 610-n. Appliances 610-1 through 610-n are communicatively coupled and act as a single platform for managing the virtualization infrastructure and deploying virtual machines.

Additionally, network 600 may include stand-alone appliances such as appliance 620. Appliance 620 is independent to other clusters and other stand-alone appliances.

It is noted that appliances in network 600 (stand-alone appliances and/or clustered appliances) are authenticated and configured to function within network 600.

It may be desired that additional appliances are added to network 600 either as a stand-alone appliance or part of an existing appliance cluster to increase the functionality of the virtualization infrastructure. Moreover, the auto-discovery of other appliances that are authenticated and configured for use in the network is beneficial to the overall management of the appliances and network.

Referring still to FIG. 6, appliance 630 is intended to be added to network 600. Appliance 630 is initially communicatively coupled to network 600 (prior to being authenticated and configured to be included in network 600).

Appliance 630 automatically broadcasts an auto-discovery request 632 over network 600 to appliances within network 600 (e.g., appliances 610-1 through 610-n and appliance 620). The auto-discovery request by appliance 630 is provided by, but is not limited to, multicast Domain Name System (MDNS) broadcasting, or Domain Name System-Service Discovery (DNS-SD). In one embodiment, the broadcasted auto-discovery request is supported by Internet Protocol version 4 (IPv4).

It is noted that it may desired that a plurality of appliances are to be added to network 600 at substantially the same time. As such, an auto-discovery request is multicasted by one or more of appliances (that are intended to be added to the network) over network 600 to appliances within network 600. In one embodiment, the multi-casted auto-discovery request is supported by Internet Protocol version 6 (IPv6).

Appliance 630 may broadcast auto-discovery request 632 at various times during operation. For example, auto-discovery request 632 may be broadcasted upon initial powering on of appliance 630, during initial operation of appliance 630, or when appliance 630 is initially communicatively coupled to network 600 (but not authenticated or configured to operate within network 600.

Auto-discovery request 632 includes a service type. For example, request 632 includes a request for devices (or appliances) that are pre-configured hyper-converged computing devices. In one embodiment, the service type in request 632 is the same as the service type of appliance 630 (e.g., pre-configured hyper-converged computing device).

As will be described in further detail below, appliances have a unique identifier. The unique identifier includes the service type of the particular appliance. As such, in one embodiment, auto-discovery request 632 includes a portion of the unique identifier of the appliance.

Appliances within network 600 provide responses 634 to auto-discovery request 632 by appliance 630. Appliances in network 600 that receive the auto-discovery request may be required to respond to the auto-discovery request. In particular, the appliances having the same service type as the service type in auto-discovery request 632 provide responses 634.

If a stand-alone appliance, such as appliance 620, in network 600 receives the auto-discovery request then the stand-alone appliance provides a response. If appliances in a cluster receive the auto-discovery request, then one or more appliances in the cluster provide a response indicating that they are in a cluster of appliances.

Responses 634 are accessed by appliance 630 and indicate the appliances that are authenticated and configured to operate in network 600.

In one embodiment, responses 634 are obtained and displayed for viewing by a user, such as an IT administrator for network 600. The user may then select for appliance 630 to join a cluster, such as cluster 610, or join network 600 as a stand-alone appliance.

In another embodiment, appliance 630 may automatically decide to join a cluster, such as cluster 610, or join network 600 as a stand-alone appliance. The automatic decision may be based on which appliances in network 600 that are most similar to appliance 630.

Example Methods of Operation of Auto-Discovery of Appliances in a Network

The following discussion sets forth in detail the operation of some example methods of operation of embodiments. With reference to FIGS. 7 and 8, flow diagrams 700 and 800 illustrate example procedures used by various embodiments. Flow diagrams 700 and 800 include some procedures that, in various embodiments, are carried out by a processor under the control of computer-readable and computer-executable instructions. In this fashion, procedures described herein and in conjunction with flow diagrams 700 and 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 700 and 800 such procedures are examples. That is, embodiments are well suited to performing various other procedures or variations of the procedures recited in flow diagrams 700 and 800. Likewise, in some embodiments, the procedures in flow diagrams 700 and 800 may be performed in an order different than presented and/or not all of the procedures described in one or more of these flow diagrams may be performed. It is further appreciated that procedures described in flow diagrams 700 and 800 may be implemented in hardware, or a combination of hardware with firmware and/or software provided by appliance 630.

FIG. 7 depicts a process flow diagram 700 for auto-discovery of appliances in a network, according to various embodiments.

At 710, of flow diagram 700, upon initial connection to a network, an auto-discovery request is automatically broadcasted an over the network, by a first pre-configured hyper-converged computing device for supporting a virtualization infrastructure, to other pre-configured hyper-converged computing devices on the network.

For example, appliance 630 is to be added to network 600 to support additional virtual machines within network 600, either as a stand-alone device or a part of an appliance cluster. Upon initial connection to a network 600, appliance 630 automatically broadcasts an auto-discovery request over the network 600 to determine if there are any other similar appliances in network 600.

At 720, a response to the auto-discovery request is received from the other pre-configured hyper-converged computing devices for auto-discovery of the other pre-configured hyper-converged computing devices on the network.

For example, existing appliances within network 600 receive auto-discovery request 632 and automatically provide responses 634 that are received by appliance 630.

At 722, in one embodiment, a response from a cluster of the other pre-configured hyper-converged computing devices are received. For example, a response from one or more of appliances in appliance cluster 610 is received.

At 724, in another embodiment, a response from a stand-alone device of the other pre-configured hyper-converged computing devices. For example, a response from appliance 620, that is stand-alone device in network 600, is received.

At 730, the first pre-configured hyper-converged computing device is enabled to join a cluster of the other pre-configured hyper-converged computing devices. For example, in response to responses 634, appliance 630 is enabled to either join appliance cluster 610 or join appliance 620 (to start a new cluster). In one embodiment, the responses are displayed to an IT admin who selects which cluster to join. In another embodiment, appliance 630 automatically selects which cluster to join.

At 740, the first pre-configured hyper-converged computing device is enabled to be a stand-alone device in the network. For example, in response to responses 634, appliance 630 is enabled to network 600 as a stand-alone appliance (similar to appliance 620). In one embodiment, the responses are displayed to an IT admin who selects that appliance 630 is to join network 600 as a stand-alone appliance. In another embodiment, appliance 630 automatically selects to join network 600 as a stand-alone appliance.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

FIG. 8 depicts a process flow diagram 800 for auto-discovery of appliances in a network, according to various embodiments.

At 810, upon initial operation of a first pre-configured hyper-converged computing device for supporting a virtualization infrastructure, an auto-discovery request is automatically broadcasted over the network, by the first pre-configured hyper-converged computing device, to other pre-configured hyper-converged computing devices on the network.

For example, appliance 630 is to be added to network 600 to support additional virtual machines within network 600, either as a stand-alone device or a part of an appliance cluster. Upon initial powering on and operation, appliance 630 automatically broadcasts an auto-discovery request over the network 600 to determine if there are any other similar appliances in network 600.

At 820, a response to the auto-discovery request is received, at the first pre-configured hyper-converged computing device, from the other pre-configured hyper-converged computing devices for auto-discovery of the other pre-configured hyper-converged computing devices on the network.

For example, existing appliances within network 600 receive auto-discovery request 632 and automatically provide responses 634 that are received by appliance 630.

At 830, the first pre-configured hyper-converged computing device is enabled to join a cluster of the other pre-configured hyper-converged computing devices. For example, in response to responses 634, appliance 630 is enabled to either join appliance cluster 610 or join appliance 620 (to start a new cluster). In one embodiment, the responses are displayed to an IT admin who selects which cluster to join. In another embodiment, appliance 630 automatically selects which cluster to join.

At 840, the first pre-configured hyper-converged computing device is enabled to be a stand-alone device in the network. For example, in response to responses 634, appliance 630 is enabled to network 600 as a stand-alone appliance (similar to appliance 620). In one embodiment, the responses are displayed to an IT admin who selects that appliance 630 is to join network 600 as a stand-alone appliance. In another embodiment, appliance 630 automatically selects to join network 600 as a stand-alone appliance.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

Examples of an Appliance and Server Nodes with Unique Identifiers

A virtualization infrastructure, such as a datacenter, includes numerous hardware devices (e.g., appliances, routers, etc.). As a result, it is burdensome for administrators of the virtualization infrastructure to manage all of the components of the virtualization infrastructure. For example, if a server node of an appliance has a failure or error, it is very difficult to determine the location of the appliance in the virtualization infrastructure and which of the server nodes in the appliance has an error.

As will be described in further detail below, unique identifiers of a server node are correlated with a location of the server nodes in the appliance to facilitate in determining the exact location of the server nodes in the appliance.

Figure 9:
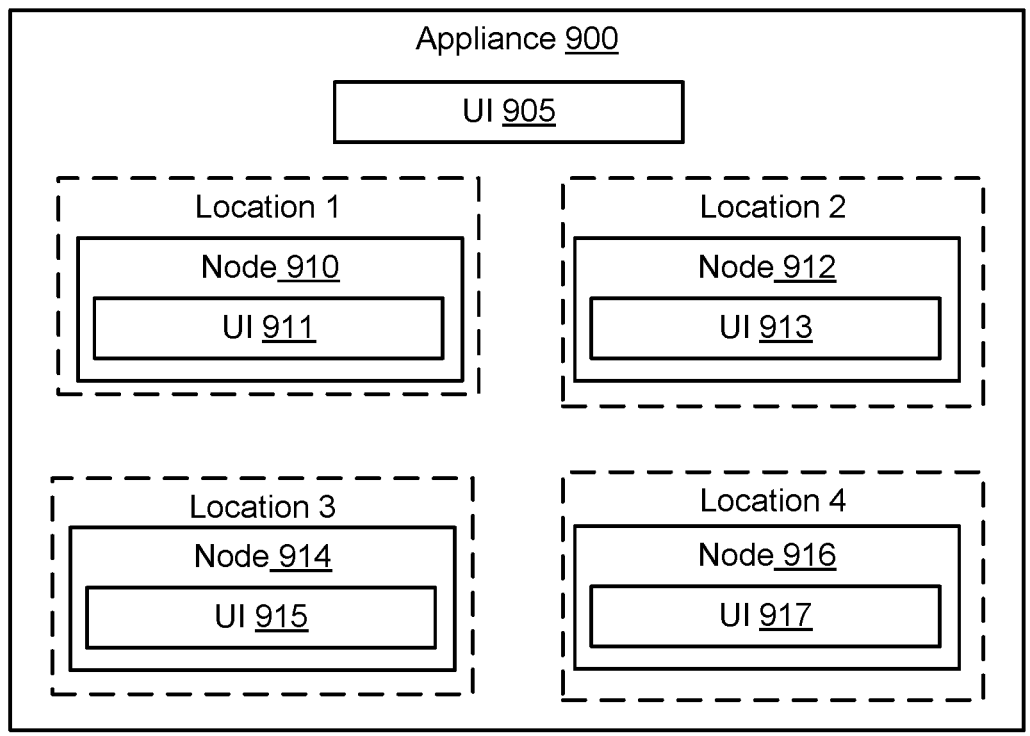
FIG. 9 depicts a block diagram of a pre-configured hyper-converged computing device, according to various embodiments.

FIG. 9 depicts an embodiment of a block diagram of appliance 900. The block diagram can be a front view or a back view of appliance 900.

Appliance 900 is a four node appliance. Accordingly, appliance 900 includes independent server node 910, independent server node 912, independent server node 914, and independent server node 916. It should be appreciated that, in various embodiments, appliance 900 can include less than four nodes or more than four nodes.

Appliance 900 includes unique identifier 905. Unique identifier 905 is any identifier that is unique to appliance 900.

Additionally, each server node includes a unique identifier. For example, independent server node 910 includes unique identifier 911, independent server node 912 includes unique identifier 913, independent server node 914 includes unique identifier 915, and independent server node 916 includes unique identifier 917. Unique identifiers of the server nodes are any identifier that are unique their respective independent server node.

Unique identifier 905 can include any information associated with the appliance 900 such as, but not limited to, manufacturing code, distribution code, supplier code, version, service type, and random information (e.g., random alphanumeric number).

Likewise, the unique identifier for each server node can include any information associated with the respective server node, such as, but not limited to, manufacturing code, distribution code, supplier code, version, service type, and random information (e.g., random alphanumeric number).

In one embodiment, unique identifier 905 includes information associated with server nodes that are a part of the appliance, such as, the unique identifiers of each server node.

Appliance 900 includes pre-defined locations for placement of independent server nodes. For example, appliance 900 includes location 1, location 2, location 3, and location 4. The designated locations correspond to the slots in which independent server nodes are disposed in appliance 900 and are communicatively coupled with appliance 900.

For example, independent server node 910 is located at location 1, independent server node 912 is located at location 2, independent server node 914 is located at location 3, and independent server node 916 is located at location 4.

In one embodiment, the locations are sequential. For example, location 1 through location 4.

In another embodiment, the locations are sequential in a pre-defined pattern. For example, the locations are sequentially numbered in a "Z" pattern. In particular, the pattern of locations 1 through 4 form a "Z" pattern, where location 1 is at the left side of the upper row, location 2 is at the right side of the upper row, location 3 is at the left of the lower row, and location 4 is at the right of the lower row. It should be appreciated that sequence of locations 1 through 4 may provide a different pattern.

The unique identifier for each node is correlated with the location or position of the server node. For example, unique identifier 911 of server node 910 is correlated/associated with location 1, unique identifier 913 of server node 912 is correlated/associated with location 2, unique identifier 915 of server node 914 is correlated/associated with location 3, and unique identifier 917 of server node 916 is correlated/associated with location 4.

Based on the correlation, as described above, the exact location of the server node within the appliance is readily determined.

For instance, it is indicated that a server in a datacenter has failed. The failed server is identified as server node 910. Unique identifier 911 of server node 910 is correlated with location 1 of appliance 900. Based on the correlation, the exact location of server node 910 is determined to be in location 1 (e.g., upper left hand side of appliance 900). As a result, once appliance 900 is located, an IT administrator or the like is able to readily identify the failed server as being the server node in location 1 (e.g., upper left hand side) of appliance 900.

Example Methods of Operation of Correlating a Unique Identifier of a Server Node with a Location in an Appliance The following discussion sets forth in detail the operation of some example methods of operation of embodiments. With reference to FIGS. 10 and 11, flow diagrams 1000 and 1100 illustrate example procedures used by various embodiments. Flow diagrams 1000 and 1100 include some procedures that, in various embodiments, are carried out by a processor under the control of computer-readable and computer-executable instructions. In this fashion, procedures described herein and in conjunction with flow diagrams 1000 and 1100 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1000 and 1100 such procedures are examples. That is, embodiments are well suited to performing various other procedures or variations of the procedures recited in flow diagrams 1000 and 1100. Likewise, in some embodiments, the procedures in flow diagrams 1000 and 1100 may be performed in an order different than presented and/or not all of the procedures described in one or more of these flow diagrams may be performed. It is further appreciated that procedures described in flow diagrams 1000 and 1100 may be implemented in hardware, or a combination of hardware with firmware and/or software provided by appliance 900.

FIG. 10 depicts a process flow diagram 1000 for correlating a unique identifier of an independent server node with a location in a pre-configured hyper-converged computing device, according to various embodiments.

At 1010 of flow diagram 1000, a unique identifier is assigned to each of plurality of independent server nodes in a pre-configured hyper-converged computing device. For example, unique identifier 911 is assigned to server node 910, unique identifier 913 is assigned to server node 912, unique identifier 915 is assigned to server node 914, and unique identifier 911 is assigned to server node 916.

At 1020, correlate the unique identifier of each of the plurality of independent server nodes with a respective location of each of the plurality of independent server nodes. For example, unique identifier 911 is correlated to location 1 of appliance 900, unique identifier 913 is correlated to location 2, unique identifier 915 is correlated to location 3, and unique identifier 911 is correlated to location 4.

At 1030, determine a location of each of the plurality of independent server nodes within the pre-configured hyper-converged computing device based on the unique identifier of each of the plurality of independent server nodes. For example, based on the correlation, as described herein, server node 910 is located at location 1, server node 912 is located at location 2, server node 914 is located at location 3, and server node 916 is located at location 4.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

FIG. 11 depicts a process flow diagram 1100 for determining a location of an independent server node in a pre-configured hyper-converged computing device, according to various embodiments.

At 1110 of flow diagram 1100, a unique identifier associated with one of a plurality of independent server nodes in a pre-configured hyper-converged computing device is accessed, wherein the unique identifier correlates to a location of the one of a plurality of independent server nodes. For example, unique identifier 917 of server node 916 is accessed.

At 1120, a location of one of a plurality of an independent server nodes in the pre-configured hyper-converged computing device is determined based on the unique identifier. For example, because unique identifier 917 is correlated or mapped with location 4 (e.g., lower right side) of appliance 900, then the location of server node 916 is readily determined (e.g., lower right side) within appliance 900.

It is noted that any of the procedures, stated above, regarding flow diagram 1100 may be implemented in hardware, or a combination of hardware with firmware and/or software. For example, any of the procedures are implemented by a processor(s) of a cloud environment and/or a computing environment.

Examples of Authentication and Configuration of an Appliance in a Network

Figure 12:
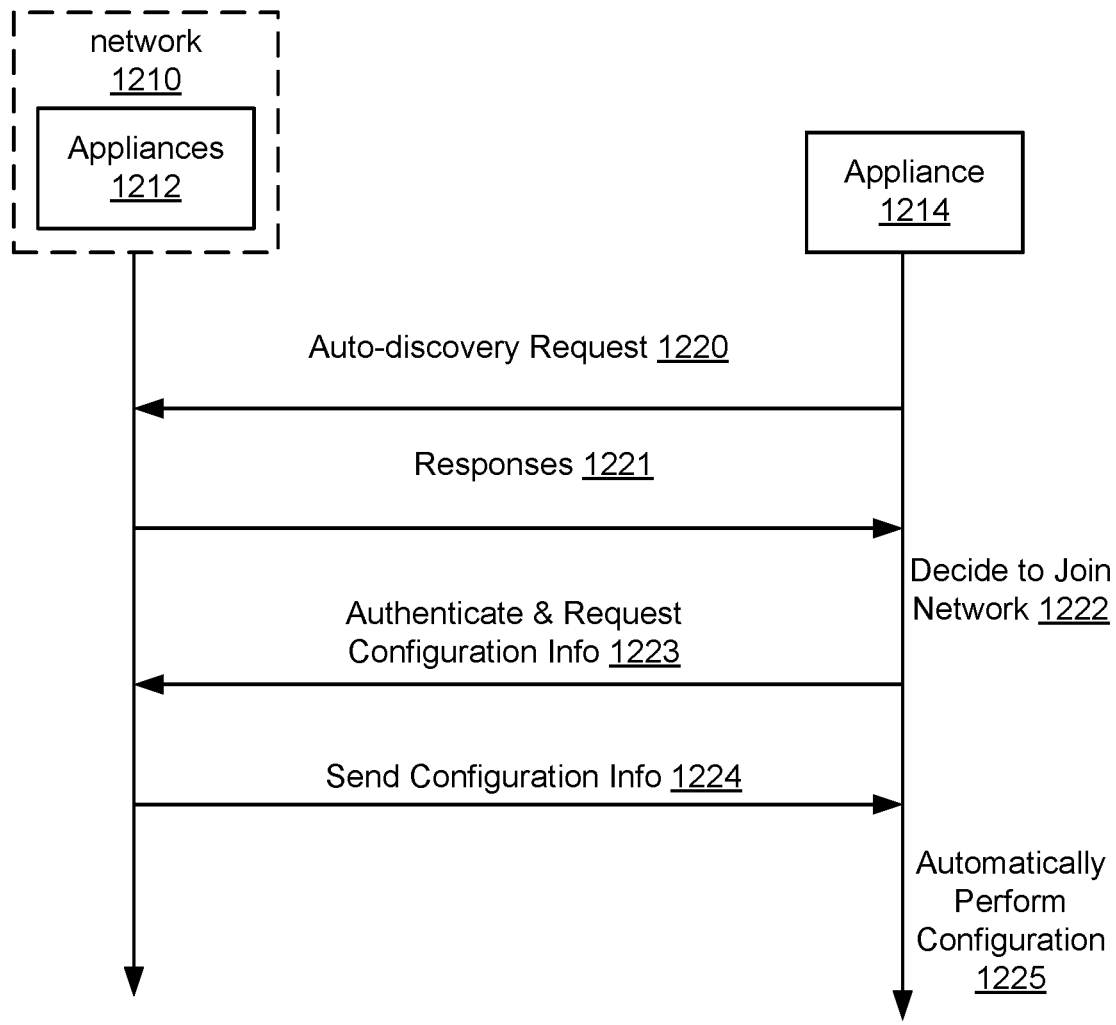
FIG. 12 depicts a flow diagram for a method for automatic network configuration of a pre-configured hyper-converged computing device, according to various embodiments.

FIG. 12 depicts a flow diagram 1200 for a method for automatic configuration of an appliance. Network 1210 includes appliances 1212. Network 1210 is similar to network 600, as described above. As such, appliances 1212 are similar to appliances in network 600. In particular, appliance 1214 is similar to appliance 630 in that it is desired that appliance 1214 is to be configured for network 1210.

At 1220, appliance 1214 broadcasts an auto-discovery request to appliances 1212 in network 1210. The broadcast by appliance 1214 is the same as the broadcast of appliance 630 described herein.

At 1221, appliances 1212 that receive the auto-discovery request provide responses to appliance 1214. The responses are the same as responses 634 described herein.

At 1222, it is decided that appliance 1214 will join the network, either as a stand-alone appliance, joining an existing appliance cluster, or creating a new cluster with an existing stand-alone device.

At 1223, appliance is authenticated with network 1210 and appliance 1214 requests network configuration information from appliances already configured in network 1212. The configuration information can be any information the enables appliance 1214 to be configured in network 1210. For example, configuration information can be, but is not limited to, internet protocol (IP) addresses, virtual local area network identification (VLAN IDs), etc.

The authentication is any secured authentication protocol, such as an authentication that utilizes a shared key.

At 1224, network configuration information is sent to appliance 1214 from one or more appliances 1212.

At 1225, appliance 1214 automatically performs the network configuration such that it is configured to be a part of network 1210.

Figure 13:
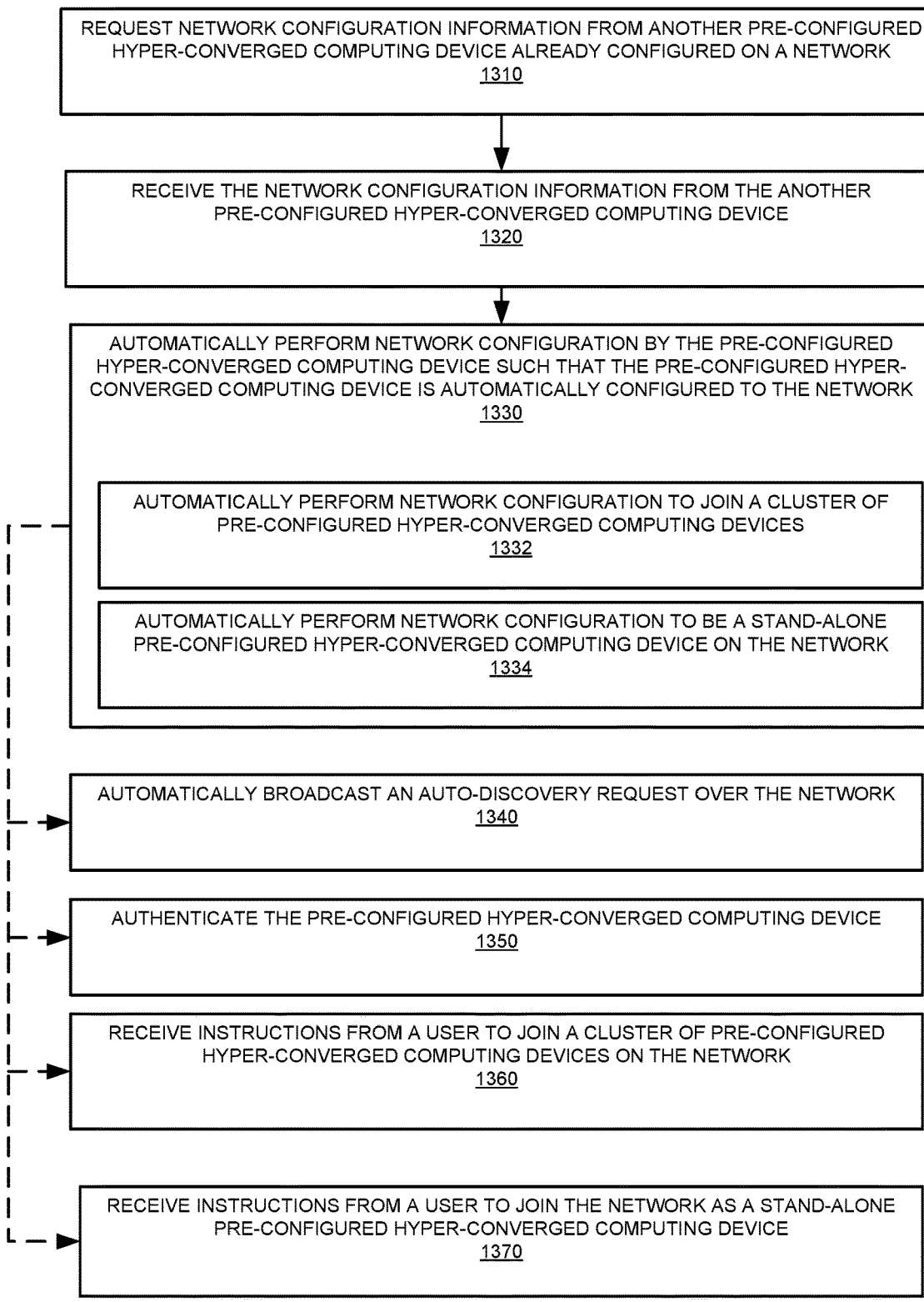
FIG. 13 depicts a flow diagram for a method for automatic network configuration of a pre-configured hyper-converged computing device, according to various embodiments.
Figure 14:
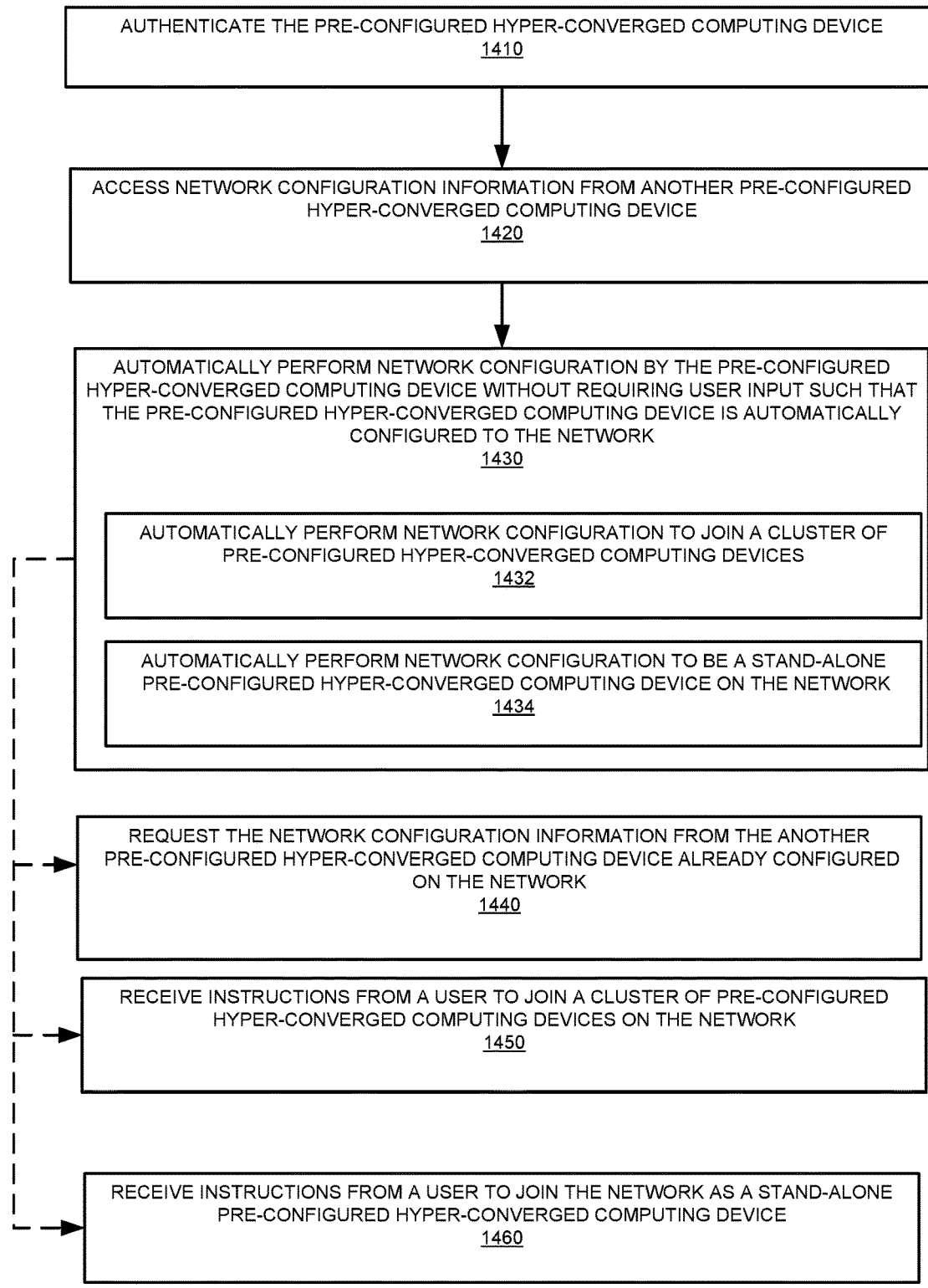
FIG. 14 depicts a flow diagram for a method for automatic network configuration of a pre-configured hyper-converged computing device, according to various embodiments.

Example Methods of Operation of Authentication and Configuration of an Appliance in a Network The following discussion sets forth in detail the operation of some example methods of operation of embodiments. With reference to FIGS. 13 and 14, flow diagrams 1300 and 1400 illustrate example procedures used by various embodiments. Flow diagrams 1300 and 1400 include some procedures that, in various embodiments, are carried out by a processor under the control of computer-readable and computer-executable instructions. In this fashion, procedures described herein and in conjunction with flow diagrams 1300 and 1400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1300 and 1400 such procedures are examples. That is, embodiments are well suited to performing various other procedures or variations of the procedures recited in flow diagrams 1300 and 1400. Likewise, in some embodiments, the procedures in flow diagrams 1300 and 1400 may be performed in an order different than presented and/or not all of the procedures described in one or more of these flow diagrams may be performed. It is further appreciated that procedures described in flow diagrams 1300 and 1400 may be implemented in hardware, or a combination of hardware with firmware and/or software provided by appliance 1214.

FIG. 13 depicts a process flow diagram 1300 of a method for automatic network configuration of a pre-configured hyper-converged computing device, according to various embodiments.

At 1310, network configuration information is requested from another pre-configured hyper-converged computing device already configured on a network. For example, in response to a decision for appliance 1214 to join network 1210 (either as a stand-alone appliance or joining a cluster of appliances), appliance 1214 requests network configuration information from appliances 1212.

At 1320, the network configuration information from the another pre-configured hyper-converged computing device is received. For example, appliance 1214 receives configuration information to join a cluster of appliances.

At 1330, network configuration by the pre-configured hyper-converged computing device is automatically performed such that the pre-configured hyper-converged computing device is automatically configured to the network. For example, appliance 1214 is pre-configured to automatically perform network configuration steps once it receives configuration information.

At 1332, network configuration to join a cluster of pre-configured hyper-converged computing devices is automatically performed. For example, if appliance 1214 is to join a cluster of appliances, then appliance 1214 automatically performs network configuration to join the cluster when it receives the network configuration information.

At 1334, network configuration to be a stand-alone pre-configured hyper-converged computing device on the network is automatically performed. For example, if appliance 1214 is to join network 1210 as a stand-alone appliance, then appliance 1214 automatically performs network configuration to join the network as a stand-alone appliance when it receives the requisite network configuration information.

At 1340, an auto-discovery request is automatically broadcast over the network. For example, appliance 1214 automatically broadcast an auto-discovery request over network 1210.

At 1350, the pre-configured hyper-converged computing device is authenticated. For example, in response to a decision to join network 1210, appliance 1214 is authenticated to join network 1210.

At 1360, instructions from a user is received to join a cluster of pre-configured hyper-converged computing devices on the network. For example, an IT administrator provides instructions via a user interface for appliance 1214 to join a cluster of appliances.

At 1370, instructions from a user are received to join the network as a stand-alone pre-configured hyper-converged computing device. For example, an IT administrator provides instructions via a user interface for appliance 1214 to join network 1210 as a stand-alone appliance.

It is noted that any of the procedures, stated above, regarding flow diagram 1300 may be implemented in hardware, or a combination of hardware with firmware and/or software. For example, any of the procedures are implemented by a processor(s) of a cloud environment and/or a computing environment.

FIG. 14 depicts a process flow diagram 1400 of a method for automatic network configuration of a pre-configured hyper-converged computing device, according to various embodiments.

At 1410, the pre-configured hyper-converged computing device is authenticated. For example, in response to a decision to join network 1210, appliance 1214 is authenticated to join network 1210.

At 1420, network configuration information from another pre-configured hyper-converged computing device is accessed. For example, appliance 1214 receives configuration information to join a cluster of appliances.

At 1430, network configuration by the pre-configured hyper-converged computing device is automatically performed without requiring user input such that the pre-configured hyper-converged computing device is automatically configured to the network. For example, appliance 1214 is pre-configured to automatically perform network configuration once it receives the requisite network configuration information.

At 1432, network configuration to join a cluster of pre-configured hyper-converged computing devices is automatically performed. For example, if appliance 1214 is to join a cluster of appliances, then appliance 1214 automatically performs network configuration to join the cluster when it receives the network configuration information.

At 1434, network configuration to be a stand-alone pre-configured hyper-converged computing device on the network is automatically performed. For example, if appliance 1214 is to join network 1210 as a stand-alone appliance, then appliance 1214 automatically performs network configuration to join the network as a stand-alone appliance when it receives the requisite network configuration information.

At 1440, the network configuration information is requested from the another pre-configured hyper-converged computing device already configured on the network. For example, in response to a decision for appliance 1214 to join network 1210 (either as a stand-alone appliance or joining a cluster of appliances), appliance 1214 requests network configuration information from appliances 1212.

At 1450, instructions from a user are received to join a cluster of pre-configured hyper-converged computing devices on the network. For example, an IT administrator provides instructions via a user interface for appliance 1214 to join a cluster of appliances.

At 1460, instructions from a user are received to join the network as a stand-alone pre-configured hyper-converged computing device. For example, an IT administrator provides instructions via a user interface for appliance 1214 to join network 1210 as a stand-alone appliance.

It is noted that any of the procedures, stated above, regarding flow diagram 1400 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method for automatic network configuration of a pre-configured hyper-converged computing device, comprising:
   requesting network configuration information from another pre-configured hyper-converged computing device already configured on a network, wherein said pre-configured hyper-converged computing device includes software to support a virtualization infrastructure, said software being proprietary software of a single entity;
   receiving said network configuration information from said another pre-configured hyper-converged computing device; and
   automatically performing network configuration by said pre-configured hyper-converged computing device such that said pre-configured hyper-converged computing device is automatically configured to said network.

2. The computer-implemented method of claim 1, wherein said automatically performing network configuration further comprises:
   automatically performing network configuration to join a cluster of pre-configured hyper-converged computing devices.

3. The computer-implemented method of claim 1, wherein said automatically performing network configuration further comprises:
   automatically performing network configuration to be a stand-alone pre-configured hyper-converged computing device on said network.

4. The computer-implemented method of claim 1, comprising:
   automatically broadcasting an auto-discovery request over said network.

5. The computer-implemented method of claim 1, comprising:
   authenticating said pre-configured hyper-converged computing device.

6. The computer-implemented method of claim 1, wherein said network configuration information is selected from a group consisting of: IP addresses, virtual local area network identifications (VLAN IDs), network time protocol (NTP), and domain name system (DNS) information.

7. The computer-implemented method of claim 1, further comprising:
   receiving instructions from a user to join a cluster of pre-configured hyper-converged computing devices on said network.

8. The computer-implemented method of claim 1, further comprising:
   receiving instructions from a user to join said network as a stand-alone pre-configured hyper-converged computing device.

9. The computer-implemented method of claim 1, wherein said pre-configured hyper-converged computing device is a two rack unit-four node (2U/4N) device.

10. The computer-implemented method of claim 1, wherein said pre-configured hyper-converged computing device comprises a plurality of independent server nodes.

11. A computer-implemented method for automatic network configuration of a pre-configured hyper-converged computing device, comprising:
   requesting network configuration information from another pre-configured hyper-converged computing device already configured on a network, wherein said pre-configured hyper-converged computing device includes software to support a virtualization infrastructure, said software being proprietary software of a single entity;
   receiving said network configuration information from said another pre-configured hyper-converged computing device;
   automatically performing network configuration by said pre-configured hyper-converged computing device such that said pre-configured hyper-converged computing device is automatically configured to said network; and
   providing an end-user with a single end-user license agreement (EULA) pertaining to said software.

12. A computer-implemented method for automatic network configuration of a pre-configured hyper-converged computing device, comprising:
   requesting network configuration information from another pre-configured hyper- converged computing device already configured on a network, wherein said pre-configured hyper-converged computing device includes software to support a virtualization infrastructure, said software being proprietary software of a single entity;
   receiving said network configuration information from said another pre-configured hyper-converged computing device; and
   automatically performing network configuration by said pre-configured hyper-converged computing device such that said pre-configured hyper-converged computing device is automatically configured to said network, wherein said software comprises a hypervisor and a storage block which are proprietary to said single entity.

13. A computer-implemented method for automatic network configuration of a pre-configured hyper-converged computing device, comprising:
   requesting network configuration information from another pre-configured hyper-converged computing device already configured on a network, wherein said pre-configured hyper-converged computing device includes software to support a virtualization infrastructure, said software being proprietary software of a single entity;
   receiving said network configuration information from said another pre-configured hyper-converged computing device;
   automatically performing network configuration by said pre-configured hyper-converged computing device such that said pre-configured hyper-converged computing device is automatically configured to said network, wherein said software comprises a hypervisor, a storage block and a graphical user interface (GUI) which are each proprietary to said single entity.

14. The computer-implemented method of claim 12, further comprising:
   providing an end-user with a single end-user license agreement (EULA) pertaining to said hypervisor and said storage block.

15. The computer-implemented method of claim 13, further comprising:

providing an end-user with a single end-user license agreement (EULA) pertaining to all of said hypervisor, said storage block and said GUI.

16. A computer-implemented method for automatic network configuration of a pre-configured hyper-converged computing device, comprising:
   requesting network configuration information from another pre-configured hyper-converged computing device already configured on a network, wherein said pre-configured hyper-converged computing device includes software to support a virtualization infrastructure, said software being proprietary software of a single entity;
   receiving said network configuration information from said another pre-configured hyper-converged computing device;
   automatically performing network configuration by said pre-configured hyper-converged computing device such that said pre-configured hyper-converged computing device is automatically configured to said network; and
   providing an end-user with a single end-user license agreement (EULA) pertaining to both said software and hardware of said pre-configured hyper-converged computing device.

17. The computer-implemented method of claim 12, further comprising:
   providing an end-user with a single end-user license agreement (EULA) pertaining to all of said hypervisor, said storage block and hardware of said pre-configured hyper-converged computing device.

18. The computer-implemented method of claim 13, further comprising:
   providing an end-user with a single end-user license agreement (EULA) pertaining to all of said hypervisor, said storage block, said GUI and hardware of said pre-configured hyper-converged computing device.

19. A non-transitory computer-readable storage medium having instructions embodied therein that when executed cause a computer system to perform a method for automatic network configuration of a pre-configured hyper-converged computing device, said method comprising:
   authenticating said pre-configured hyper-converged computing device, wherein said pre-configured hyper-converged computing device includes software to support a virtualization infrastructure, said software being proprietary software of a single entity;
   accessing network configuration information from another pre-configured hyper-converged computing device; and
   automatically performing network configuration by said pre-configured hyper-converged computing device without requiring user input such that said pre-configured hyper-converged computing device is automatically configured to said network.

20. A computer-implemented method for automatic network configuration of a pre-configured hyper-converged computing device, comprising:
   requesting network configuration information from another pre-configured hyper-converged computing device already configured on a network, wherein said pre-configured hyper-converged computing device includes software to support a virtualization infrastructure, said software being proprietary software of a single entity said software comprising:
      a hypervisor;
      a storage block; and
      a graphical user interface (GUI;
   receiving said network configuration information from said another pre-configured hyper-converged computing device;
   automatically performing network configuration by said pre-configured hyper-converged computing device such that said pre-configured hyper-converged computing device is automatically configured to said network; and
   providing an end-user with a single end-user license agreement (EULA) pertaining to said software, said single EULA pertaining to both said software and hardware of said pre-configured hyper-converged computing device.

* * * * *